United States Patent [19]

Doi

[11] Patent Number: 4,730,885
[45] Date of Patent: Mar. 15, 1988

[54] LASER FIBER CONNECTOR

[75] Inventor: Yuzuru Doi, Tokyo, Japan

[73] Assignee: Asahi Kogaku Kogyo Kabushiki Kaisha, Tokyo, Japan

[21] Appl. No.: 884,341

[22] Filed: Jul. 11, 1986

[30] Foreign Application Priority Data

Jul. 11, 1985 [JP] Japan .................. 60-152778

[51] Int. Cl.⁴ .................. G02B 6/26
[52] U.S. Cl. .................. 350/96.15; 350/96.21
[58] Field of Search .......... 350/96.15, 96.18, 96.20, 350/96.21; 250/227; 73/198, 861

[56] References Cited

U.S. PATENT DOCUMENTS

| | | | |
|---|---|---|---|
| 4,011,754 | 3/1977 | Pitt | 250/227 X |
| 4,543,477 | 9/1985 | Doi et al. | 250/227 |
| 4,641,912 | 2/1987 | Goldenberg | 350/96.15 X |

FOREIGN PATENT DOCUMENTS

2517019 10/1976 Fed. Rep. of Germany ... 350/96.18

*Primary Examiner*—John Lee
*Assistant Examiner*—Michael Menz
*Attorney, Agent, or Firm*—Sughrue, Mion, Zinn, Macpeak and Seas

[57] ABSTRACT

A closed, hollow connector housing mounts a pair of laser fibers in end facing position internally within the hollow connector housing for immersion in a light-transmissible liquid. A pump drives the light-transmissible liquid within a circulation loop through pipes opening to opposite sides of the connector housing such that the liquid flows across the interface between the end to end facing optical fibers. Heat generated by scattered light reflections is dissipated by circulation of the liquid and the occurrence of scattered reflections is minimized by the presence of the liquid. A flow rate sensor responsive to the rate of flow of the light-transmissible liquid feeds an electrical signal through a drive circuit to a shutter mechanism for preventing light-transmission from the power laser light source to one of the laser fibers absent a sufficient of circulation flow rate of the light-transmissible liquid through the connector housing.

2 Claims, 2 Drawing Figures

LASER FIBER CONNECTOR

FIELD OF THE INVENTION

The present invention relates to a connector for connecting laser fibers, end to end to each other, which fibers are used, for example, within an industrial laser processing machine, a medical laser apparatus, or the like.

BACKGROUND OF THE INVENTION $CO_2$ laser and YAG lasers are mainly in the form of industrial lasers. In addition to those lasers, Ar lasers are used as medical power lasers. Laser fibers are used for transmitting various sorts of laser light, and laser fibers made of silicon glass are employed generally for lasers, except for $CO_2$ lasers which may melt glass. By using laser fibers, it is possible to transmit laser light effectively over long distances, for example, about 100 m. In use, separate laser fibers are often connected to each other for the purpose of branching or distributing laser light from one power laser to a plurality of places where the laser light is to be used, or for other purposes.

In the construction of conventional laser fiber connectors, scatter reflections of laser light at rates of from several to several tens % have occured at connecting portions, thereby causing accidents due to resultant heat, such as fires, or the like. A power laser having a high output on the order of from seVeral to several hundreds watts, results in a high possibility of accidents such as a fire, or the like, caused by heat due to the scatter reflections of laser light at the connecting portions of the laser fibers, if the rate of the scatter reflections is large. In order to solve this problem, conventionally, laser fibers to be connected to each other are brought into close contact with each other and then connected through fusion or by using a bonding agent. In this case, however, if the laser fibers to be connected are fixedly connected to each other, there is the disadvantage that the whole of the fibers must be replaced when an end of any one of the laser fibers is made unusable by damage.

In the case where foreign matter or filth adheres to the emission side tip end of the laser fiber in operations of mechanical processing or medical treatment, and if laser irradiation is performed with the foreign matter or filth adhered, avoidable damage due to heat may be caused to the tip end of the laser fiber, and the tip end is apt to be damaged by mechanical impact. In this case, the replacement of the whole of the laser fibers causes no problem if the laser fibers are short, for example, on the order of several meters. However, a large loss results in the case where the laser fibers are on the order of several tens of meters, in view of both workability and economy. Therefore, there is needed a connecting structure for laser fibers which has no connecting loss and no possibility of occurrence of heat problems.

It is, therefore, a primary object of the present invention to provide a conventional power laser apparatus with a connecting structure for laser fibers which results in reduced connecting loss, and wherein, even if scatter reflections result in the generation of heat, the heat may be dissipated effectively.

SUMMARY OF THE INVENTION

The present invention is predicated on the basis that it is possible to reduce the connecting loss between laser fibers and to obtain a cooling effect by immersing the respective connecting end portion of the laser fibers in a light-transmissible liquid. The invention is further predicated on a connector structure which has the feature that the respective end portions of the laser fibers to be connected are caused to face each other inside a closed connecting housing with respective fiber optical axes coincident with each other, and wherein a light-transmissible liquid is circulated through the connecting housing. Further, it is desirable that the reflective index of the light-transmissible liquid is made close to that of the core material of the laser fibers, and in the above-mentioned structure, and wherein not only is connecting loss decreased by suppressing the reflection of laser light at the end portions of the fibers, but a cooling effect is obtained for those fiber ends.

DESCRIPTION OF THE PREFERRED EMBODIMENT

Figure 1:
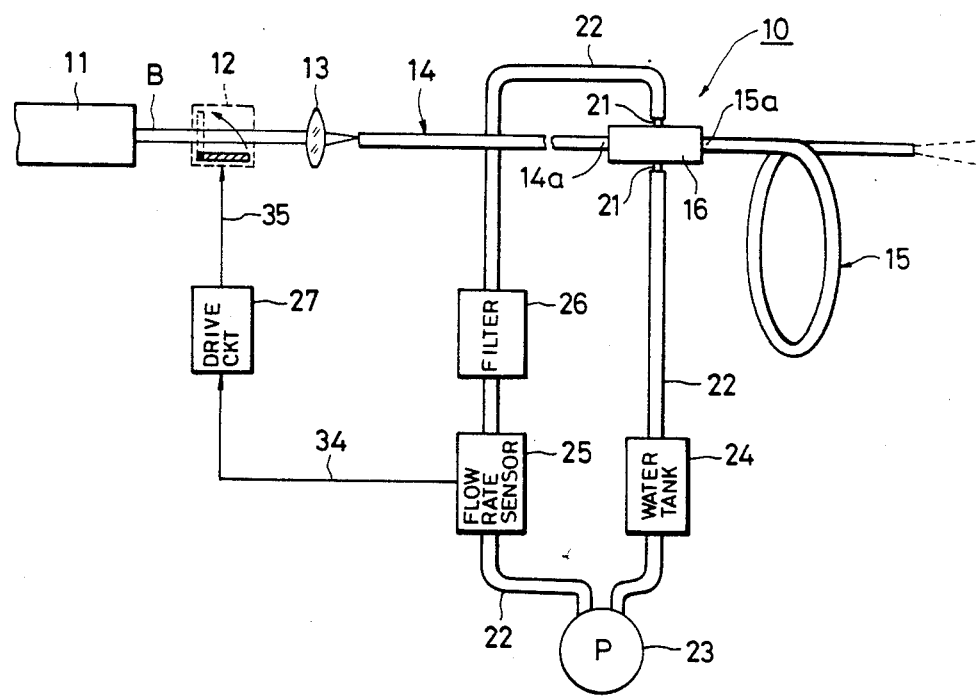
FIG. 1 is a schematic diagram of a laser apparatus which incorporates a laser fiber connector in accordance with the present invention, and forming a preferred embodiment thereof.

Referring to FIG. 1, there is shown a laser apparatus incorporating a connector 10 for laser fibers according to the present invention. A power laser light beam B is emitted from a power laser light source 11 and is passed through a normally closed shutter mechanism 12 to enter an incident end surface of a fixed side laser fiber 14 through a condenser lens 13. A terminal side laser fiber 15 is positioned for end to end optical coupling with the laser fiber 14. Respective end portions 14a, 15a, of the fibers 14, 15 are inserted into the interior of a closed connecting housing 16 of connector 10.

Figure 2:
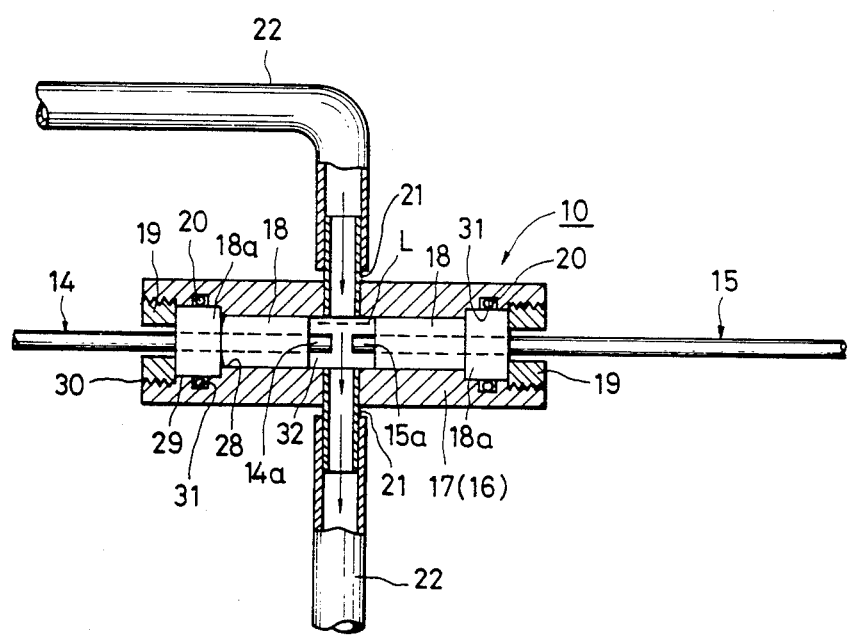
FIG. 2 is a vertical cross-section of the main portion of the laser apparatus of FIG. 1 showing a preferred embodiment of the fiber laser connector of the present invention.

Turning to FIG. 2, the components of connector 10 may be seen in greater detail. The ends 14a, 15a, of the laser fibers 14, 15 are held respectively by cylindrical centering jigs 18, which are insertably mounted into opposite end portions of a cylindrical member 17. In that respect, the cylindrical member 17 is provided with a bore 28, and at opposite ends with first counter bores 29, and further tapped counter bores 30. The centering jigs 18 include radially enlarged end portions 18a, which are respectively received within counter bores 29. A pair of fixing screws 19 are provided to the connector 10 each fixing screw being threaded into a respective tapped counter bore 30. The connecting housing 16, is formed such that respective optical axes of laser fibers 14 and 15 are made to mechanically substantially agree with each other owing to the fitting accuracy between the laser fibers 14 and 15, and the centering jigs 18, and between the centering jigs 18 and the cylindrical member 17. The centering jigs 18 may be made, for example, of a ceramic material of superior heat-proof capability having a high degree of hardness. A pair of circular grooves 31 are provided within the counter bores 29, which grooves 31 receive o-rings 20 interposed between the cylindrical member 17 and the radially enlarged portions 18a of respective centering jigs 18 to maintain the liquid tightness of cavity 32 interior of the housing 16. Radial holes are provided within the cylindrical member 17 at diametrically opposed positions, which holes receive, respectively, nipples 21, such that ends of the nipples 21 project radially outwardly of the cylindrical member 17 and to which nipples 21 are mounted liquid circulation pipes 22. As seen in FIG. 1, the circulation pipes 22 lead from a pump 23 to one nipple 21 and from the other nipple 21 back to the pump 23. Within the circulation path, there is also provided a water tank 24, a flow rate sensor 25, and a filter 26. The flow rate sensor produces an electrical signal which is fed through line 34 to the drive circuit 27, and a control signal from the drive circuit 27 is transmitted via line 35 to the normally closed shutter mechanism 12. The connection of the flow rate sensor 25 with the drive circuit 27 and, in turn, to the shutter mechanism 12, is such as to enable the normally closed shutter mechanism 12 to operate to shift to opening position when the flow rate of the liquid detected by the flow rate sensor 25 exceeds a predetermined value. A light transmissible liquid L fills the liquid circulation pipe 22 and the cavity 32 within the cylindrical member 17, and the liquid is selected to have a refractive index with is the same as, or near that of the core material of the laser fibers 14, 15. In the case where the laser fibers 14, 15 are made of silica glass, good results may be obtained for example, by using ethylene glycol (HOCH$_2$ CH$_2$ OH) having a refractive index n=1.43. Alternatively, pure water having a refractive index n=1.33 may be used as the light-transmissible liquid L.

In operation, the pump 23 is driven so as to effect a circulation of liquid clockwise within the loop formed by pipes 22 in the direction of the arrows, FIG. 2, while the power laser light source 11 is energized and the shutter mechanism 12 open to produce a laser light beam which passes across the interface defined by the laser fiber ends 14a, 15a. The laser light, omitted from the power laser light source 11, is collected at the laser light incident end surface of the laser fiber 14 through the condenser 13 when the shutter mechanism 12 opens. The power laser light passes through the laser fiber 14 and enters the connecting housing 16. In the housing 16, the laser light exits from the end surface of the laser fiber end 14a, and immediately enters the adjacent laser fiber 15 through its end surface. At this time, scatter reflections are minimized because the power laser light passes readily through the light transmissible liquid having a refractive index near that of the laser fiber core, so that the power laser light enters the laser fiber 15 with high light transmission efficiency. Even if some scatter reflections should occur and which would normally generate a large amount of heat, the heat is readily dissipated by means of the circulating liquid L so that there is no risk of occurrence of any accidental fire, or the like, due to the occurrence of heat.

Further, according to the illustrated embodiment of the invention, the shutter mechanism 12 is not opened by the drive circuit 27 prior to the flow rate of the liquid L, detected by the flow rate sensor 25, reaching a predetermined value capable of insuring light transmission between the fiber ends 14a, 15a, without a large amount of heat being generated due to scatter reflections. As a result, safety is insured because the laser light, even if created by the power light source 11, does not reach the laser fiber 14 unless an adequate cooling effect is obtained by the circulation of the liquid by operation of the pump 23.

As may be appreciated from the above description, by use of the laser fiber connector in accordance with the present invention, the respective end portions of the laser fibers to be connected to each other are immersed in the light-transmissible liquid L flowing through the closed connecting housing 16, so that the occurrence of scatter reflections of laser light at the fiber ends is minimized. Additionally, even if some heat should be generated by such scatter reflections, such heat can be effectively dissipated due to the circulation of the liquid L across the interface between the fiber ends 14a, 15a and troubles as a result of heating including the occurrance of a fire may be prevented by use of the laser fiber connector, in accordance with the present invention.

While the invention has been particularly shown and described with reference to a preferred embodiment thereof, it would be understood by those skilled in the art that various changes in the form and details may be made therein without departing from the spirit and scope of the invention.

What is claimed is:

1. A laser fiber connector (10) for optically connecting optical fibers (14, 15) to transmit laser light from a power laser light source (11) operably coupled to one of the optical fibers to the other optical fiber, the connector comprising:
    (a) a hollow connecting housing (17) for securing both optical fibers;
    (b) means (18, 19, 20) for sealably positioning end faces (14a, 15a) of the optical fibers in a closely proximate and axially aligned relationship within said housing;
    (c) liquid circulating means (22, 23, 24, 26) defining a predetermined path of liquid flow for circulating a light-transmissible cooling liquid through said housing and transversely across said end faces of the optical fibers;
    (d) a flow rate sensor (25) disposed in the liquid flow path;
    (e) a normally closed shutter mechanism (12) interposed between the laser light source and the optical fiber receiving the light source, and
    (f) drive means (27) for opening the shutter mechanism in response to a signal from said flow rate sensor indicating that the liquid flow rate through the liquid circulating means is above a predetermined value.

2. The laser fiber connector according to claim 1, in which said light-transmissible liquid is selected from the group consisting of pure water and ethylene glycol.

* * * * *